United States Patent
Lau et al.

(10) Patent No.: US 7,312,943 B2
(45) Date of Patent: Dec. 25, 2007

(54) READ WRITE (RW) HEAD POSITION CONTROL FOR SELF SERVO WRITING PROCESS

(75) Inventors: King Wai Thomas Lau, Santa Clara, CA (US); Ara W. Nazarian, Tustin, CA (US); Benjamin Geunbae Ryu, Cupertino, CA (US); Richard Koonwai Wong, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 11/269,068

(22) Filed: Nov. 8, 2005

(65) Prior Publication Data
US 2007/0070538 A1    Mar. 29, 2007

Related U.S. Application Data

(60) Provisional application No. 60/721,456, filed on Sep. 28, 2005.

(51) Int. Cl.
*G11B 21/02* (2006.01)
(52) U.S. Cl. .......................... 360/75; 360/52
(58) Field of Classification Search ............ None
See application file for complete search history.

(56) References Cited

U.S. PATENT DOCUMENTS

| | | | | |
|---|---|---|---|---|
| 5,668,679 A | * | 9/1997 | Swearingen et al. | 360/75 |
| 6,943,978 B1 | * | 9/2005 | Lee | 360/75 |
| 6,965,489 B1 | * | 11/2005 | Lee et al. | 360/75 |
| 6,967,799 B1 | * | 11/2005 | Lee | 360/51 |
| 7,113,362 B1 | * | 9/2006 | Lee et al. | 360/77.04 |
| 7,123,433 B1 | * | 10/2006 | Melrose et al. | 360/77.04 |

* cited by examiner

*Primary Examiner*—K. Wong
(74) *Attorney, Agent, or Firm*—Garlick Harrison & Markison LLP; Robert A. McLauchlan, III

(57) ABSTRACT

The present invention provides a method of generating magnetic reference patterns on a disk or other magnetic media. This involves writing a first magnetic reference pattern to the disk with a servo writer. The disk may then be transferred to a hard disk drive. Control circuitry within the hard disk drive may recognize the first magnetic reference pattern and then position a RW head within the hard disk drive based on the first magnetic reference pattern. As the RW drive is accurately positioned based on the first magnetic reference pattern a second magnetic reference pattern may be written to the disk using the RW head. The RW head location is determined based on the velocity and phase between the read-write head and servo setter marks contained within the first magnetic reference pattern.

25 Claims, 14 Drawing Sheets

READ WRITE (RW) HEAD POSITION CONTROL FOR SELF SERVO WRITING PROCESS

CROSS REFERENCE TO RELATED APPLICATIONS

This application claims the benefit of priority to and incorporates herein by reference in its entirety for all purposes, U.S. Provisional Patent Application No. 60/721,456 entitled "READ WRITE (RW) HEAD POSITION CONTROL FOR SELF SERVO WRITING PROCESS," by King Wai Thomas Lau, et al. filed on Sep. 28, 2005.

TECHNICAL FIELD OF THE INVENTION

The present invention relates generally to writing reference patterns to magnetic media, and more particularly, a self servo writing process.

BACKGROUND OF THE INVENTION

The structure and operation of hard disk drives is generally known. Hard disk drives include, generally, a case, a hard disk having magnetically alterable properties, and a read/write mechanism including Read/Write (RW) heads operable to write data to the hard disk by locally alerting the magnetic properties of the hard disk and to read data from the hard disk by reading local magnetic properties of the hard disk. The hard disk may include multiple platters, each platter being a planar disk.

All information stored on the hard disk is recorded in tracks, which are concentric circles organized on the surface of the platters. FIG. 1 depicts a pattern of radially-spaced concentric data tracks 12 within a disk 10. Data stored on the disks may be accessed by moving RW heads radially as driven by a head actuator to the radial location of the track containing the data. The track-based organization of data on the hard disk(s) allows for easy access to any part of the disk, which is why hard disk drives are called "random access" storage devices.

Since each track typically holds many thousands of bytes of data, the tracks are further divided into smaller units called sectors. This reduces the amount of space wasted by small files. Each sector holds 512 bytes of user data, plus as many as a few dozen additional bytes used for internal drive control and for error detection and correction.

Typically, these tracks and sectors are created during the low level formatting of the disk. This low level formatting process creates the physical structures (tracks, sectors, control information) on the disk. Normally, this step begins with the hard disk platters containing no information. Newer disks use many complex internal structures, including zoned bit recording to put more sectors on the outer tracks than the inner ones, and embedded servo data to control the head actuator. Newer disks also transparently map out bad sectors. Due to this complexity, all modern hard disks are low-level formatted at the factory for the life of the drive.

This low level formatting is usually performed using external servo writers that write the physical structures to disk 10 during manufacturing. Accurate positioning of the physical structures is achieved within the external servo writer by accurately controlling the RW head position within the external servo writer. External servo writers, because of the high degree of positioning accuracy required, have become an expensive processing bottleneck during the hard disk drive manufacturing.

Self servo writing (SSW) attempts to overcome this expensive and time-consuming bottleneck. External servo writers write a first magnetic reference pattern (servo pattern) on the surface of the disk. The disk may then be assembled into a hard disk drive, where the LLF is initially performed within the hard disk drive. In SSW, the LLF is completed within the hard disk drive without using additional external hardware. The LLF uses the servo pattern written by the external servo writer to create the physical structures on the disk.

During most SSW processes, the position of the RW heads may drift from their targeted position. This drift may introduce a position error following completion of the SSW process. Further, since the position of each subsequent radial track may depend on the position of the previously written track, this position error can accumulate during the SSW process. Therefore, the accumulation of positioning errors should be addressed such that the position errors accumulated during the SSW process may be reduced or eliminated.

SUMMARY OF THE INVENTION

Embodiments of the present invention are directed to systems and methods that are further described in the following description and claims. Advantages and features of embodiments of the present invention may become apparent from the description, accompanying drawings and claims.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Preferred embodiments of the present invention are illustrated in the FIGS., like numerals being used to refer to like and corresponding parts of the various drawings.

Embodiments of the present invention provide a system or method operable to locate and position a read-write (RW) head in order to enable self-servo writing (SSW) processes within a hard disk drive that substantially addresses the above-identified needs. A first embodiment of the present invention provides a method to generate magnetic reference patterns, such as sector and track patterns on magnetic media or disc. This involves writing a first magnetic reference pattern to the disk with a servo writer. The disk may be then transferred from the servo writer to a standard hard disk drive. This hard disk drive contains a disk controller that recognizes the first magnetic reference pattern and is operable to accurately locate and position the RW head of the hard disk drive based on velocity and phase errors between the RW head and servo setter marks (SSMs) within the first magnetic reference pattern. By accurately positioning the RW head, a second magnetic reference pattern that defines the physical structures (i.e. tracks and sectors) may be written to the disc.

Another embodiment of the present invention provides a hard disk drive that includes a disk controller, at least one RW head, and at least one disk or platter. This disk or platter initially contains only a first magnetic reference pattern. The disk controller locates and positions the RW head to write a second magnetic reference pattern to the disk wherein the disk controller locates and positions the RW head based on a velocity and phase difference between the RW head and SSMs within the first magnetic reference pattern.

By positioning the RW head using the velocity and phase error, the disk controller control the velocity and phase (i.e. location) of the RW head relative to the first magnetic reference pattern. This type of positioning reduces or eliminates accumulated position errors associated with prior SSW processes that accumulated position errors while performing the SSW process. The reduction or elimination of position errors results in a higher quality definition of physical structures (i.e. sectors and tracks) within the hard disk that may ultimately result in both lower product cost and high product yield.

Figure 2:
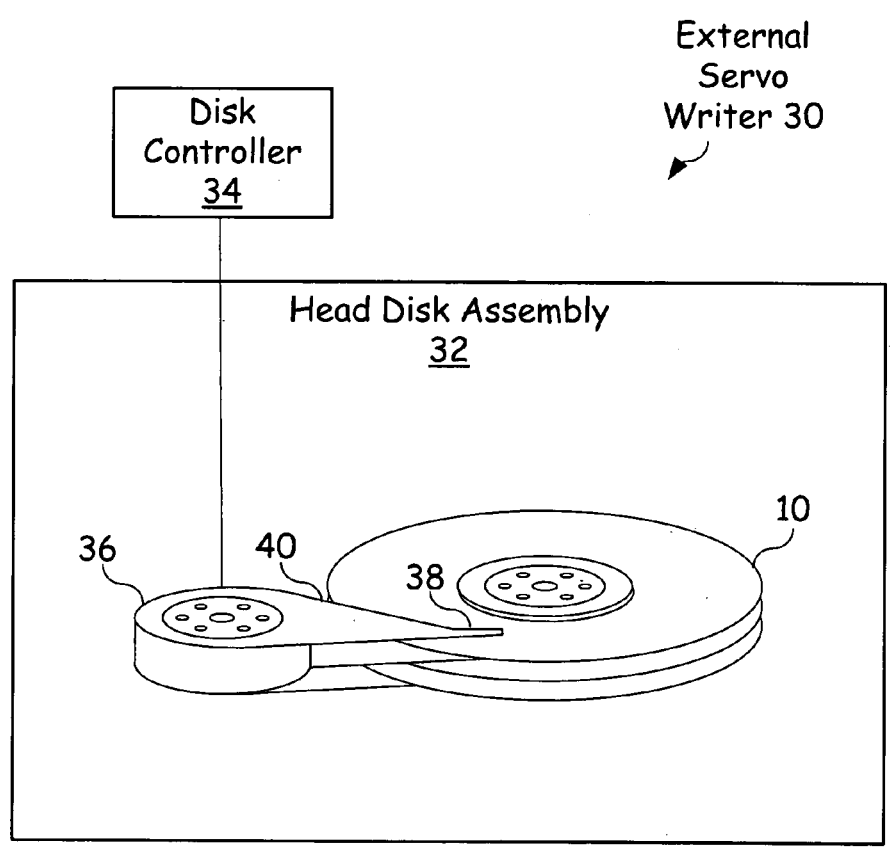
FIG. 2 is a system diagram of an external servo writer.

FIG. 2 is a system diagram of an external servo writer 30. External servo writer 30 includes a head disk assembly 32, Disk controller 34, actuator 36, and RW head 38 located at the distal end of arm 40. Disk controller 34 may determine the first magnetic reference pattern (servo pattern) to be written onto disk 10. Disk controller 34 may function as a disk controller operable to direct the positioning of a RW head 38 over disk 10 with the use of a precision positioning system such as, but not limited to a laser guided positioning system.

Figure 3:
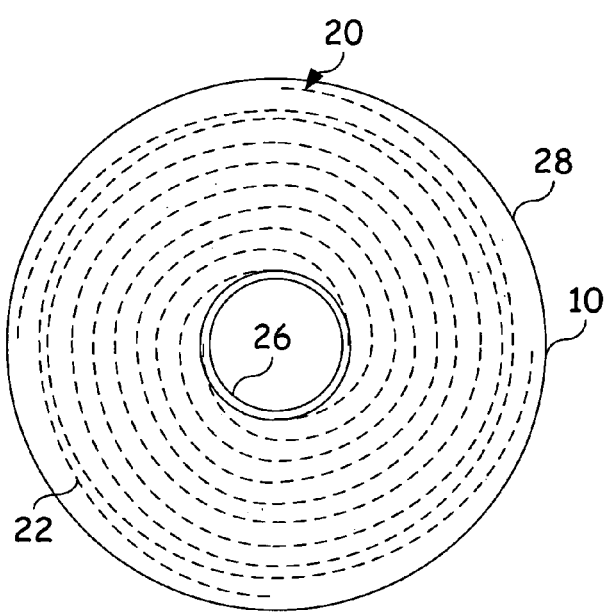
FIG. 3 depicts a disk which has had a first magnetic pattern written to the disk using external servo writer.
Figure 4A:
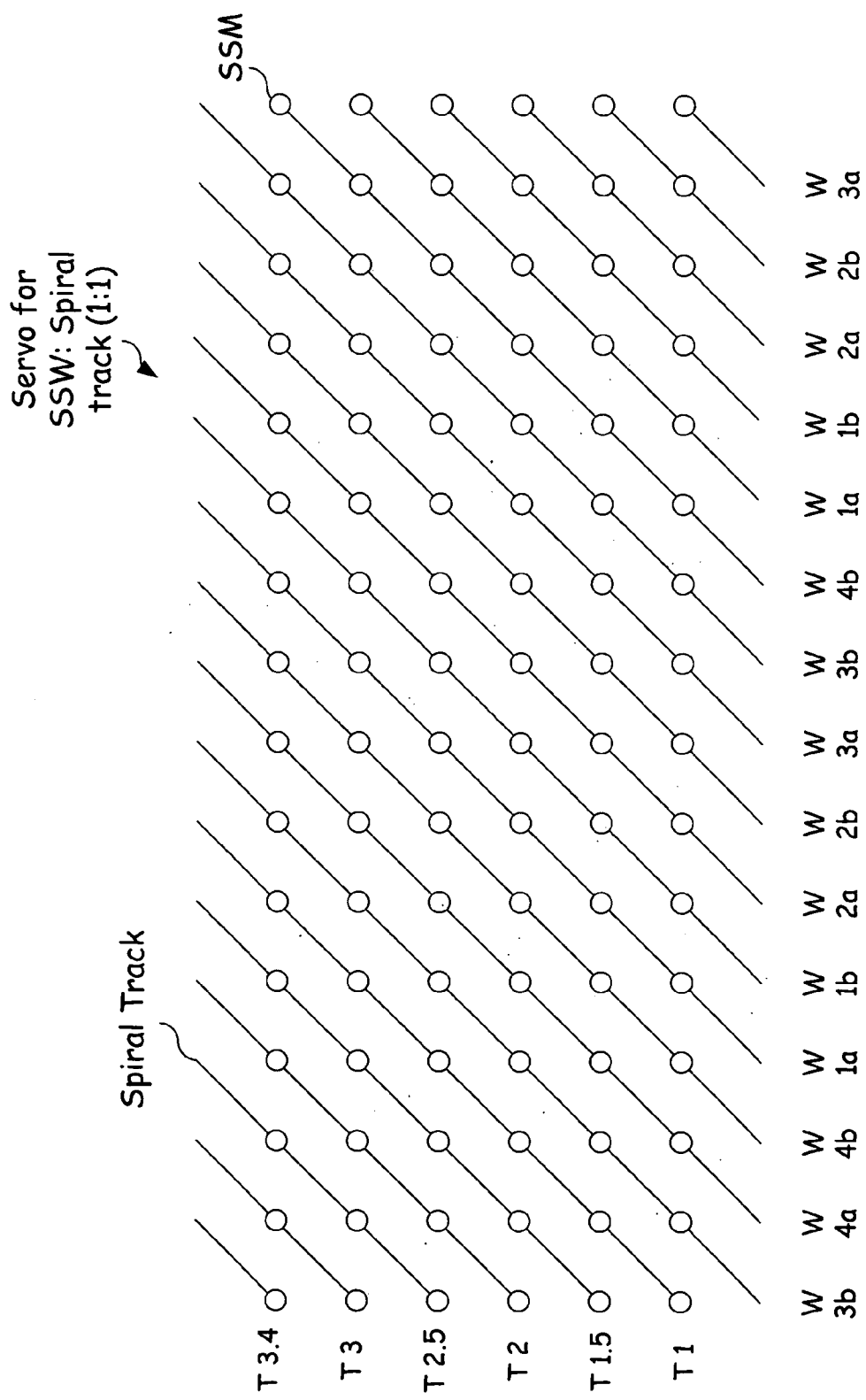
FIGS. 4A and 4B depict spiral reference patterns having various slopes.
Figure 4B:
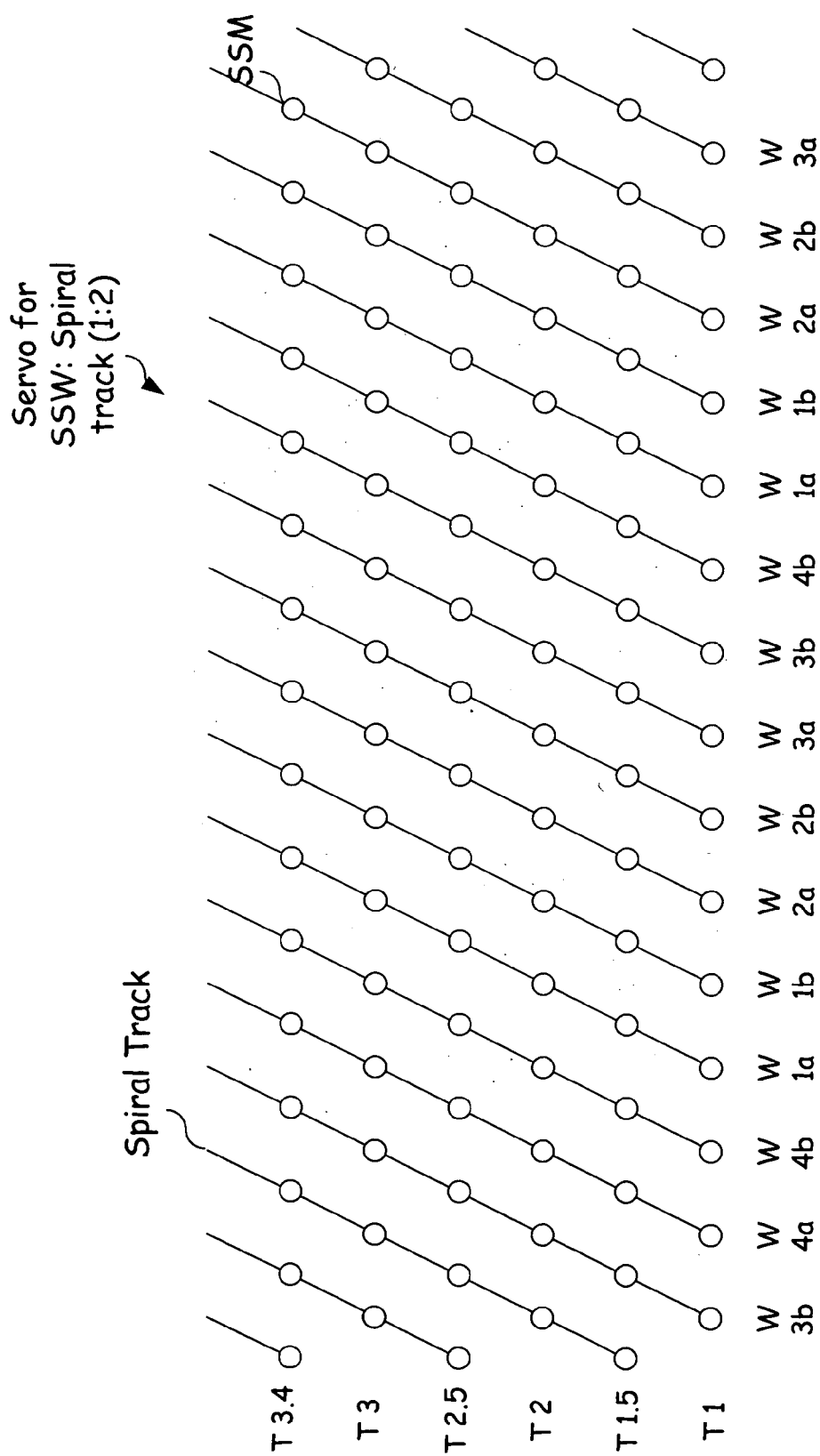

FIG. 3 depicts a disk 10 which has had a first magnetic pattern 20 written to the disk using external servo writer 30. Here, first magnetic pattern 20 is depicted as a plurality of spirals 22 that each contains a further plurality of servo setter marks (SSM) 24 as depicted if FIGS. 4A and 4B. FIGS. 4A and 4B depict how the slope of the spiral servo pattern may vary. This pattern may be written either from the inner diameter 26 to outer diameter 28 or from outer diameter 28 to inner diameter 26.

Figure 1:
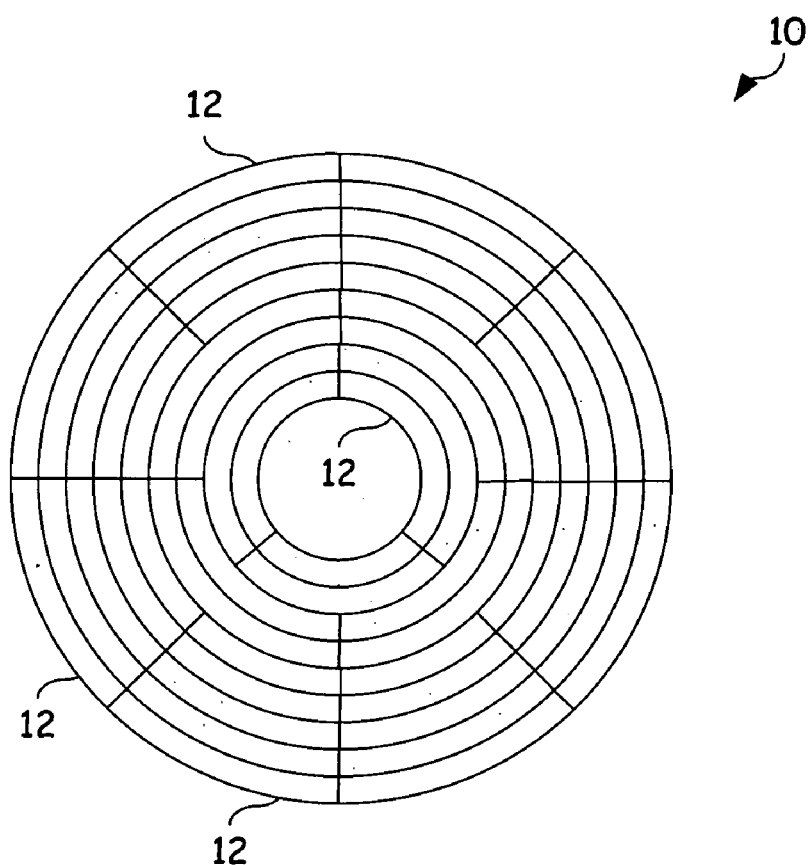
FIG. 1 depicts a pattern of radially spaced concentric data tracks within the magnetic media of a disk.

Each spiral pattern 20, as well as the slope of each spiral pattern, is selected such that the external servo writer can process disk 10 in a shorter period of time as compared to the time required to write a complete set of concentric tracks as depicted in FIG. 1. Additionally, the spiral reference pattern 20 selected should avoid or minimize positioning errors inherent in writing the spiral reference pattern or other first magnetic pattern on disk 10. Disk 10 may be removed from the external servo writer 30 and placed within a conventional hard disk drive 50 to create the physical structures depicted in FIG. 1 (i.e. tracks and sectors) on the disk.

Figure 5:
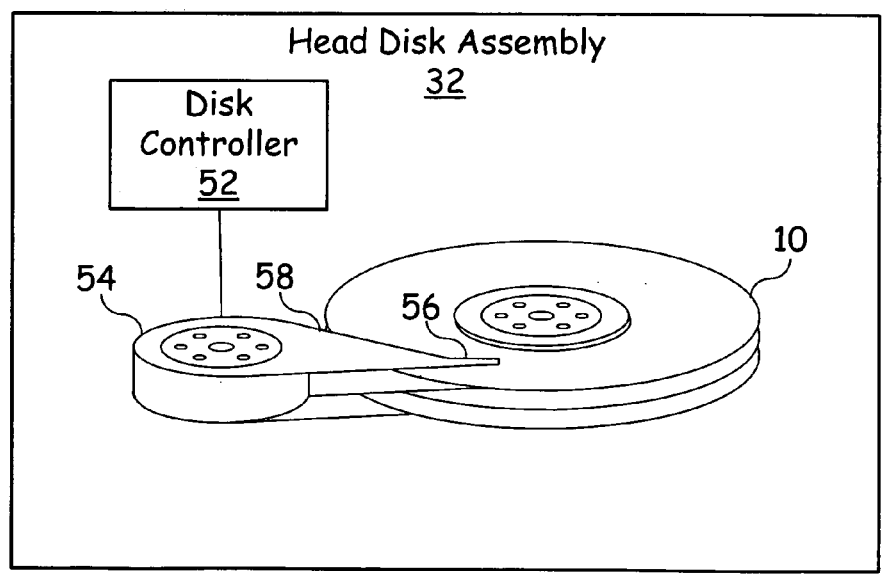
FIG. 5 depicts a hard disk drive that includes a control circuitry, a hard disk, an actuator, a RW head and positioning arm in accordance with an embodiment of the present invention.
Figure 6:
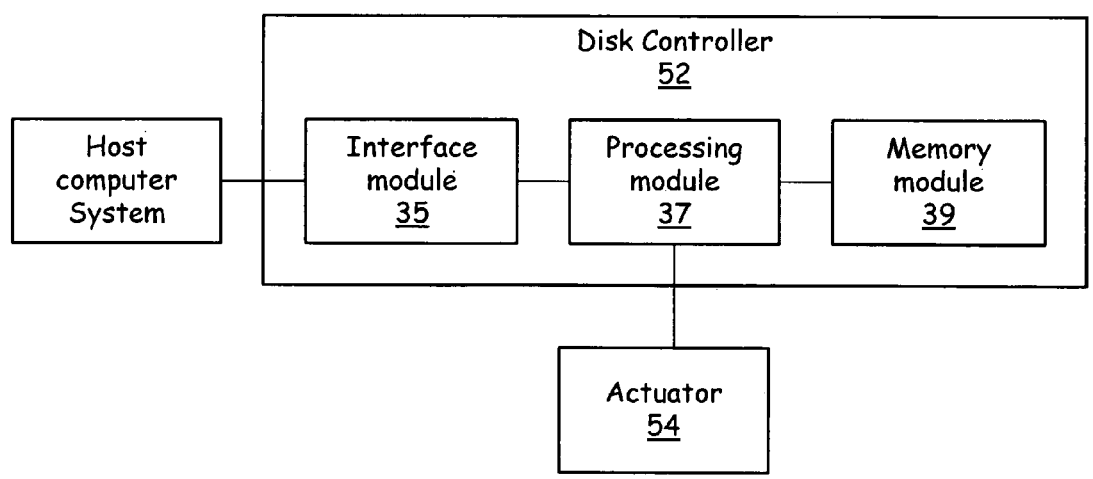
FIG. 6 is a functional block diagram of a disk controller in accordance with an embodiment of the present invention.

FIG. 5 depicts a hard disk drive 50 that includes disk controller 52, hard disk (magnetic media) 10, actuator 54, RW head 56 and positioning arm 58. Disk controller 52 as shown in FIG. 6 includes an interface module 61, processing module 63 and memory module 65. Disk Controller 52, which may be implemented as an integrated circuit or series of discrete components, may interface with a host computer system and direct the operation of the other internal components within hard disk drive 50.

Processing module 63 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. Memory module 65 may take the form of a single memory device or a plurality of memory devices. Such a memory device may be a read-only memory, random access memory, volatile memory, non-volatile memory, static memory, dynamic memory, flash memory, cache memory, and/or any device that stores digital information. Note that when the Disk controller 52 implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. Processing module 63 stores and executes operational instructions corresponding to at least some of the steps and/or functions illustrated with reference to FIGS. 10 and 11.

Disk controller 52 may compute a position error for RW head 56 with respect to a circular trajectory in response to the first reference magnetic pattern 20. More specifically, control circuitry 52 is operable to determine the position of the RW head 56 by sensing both the velocity and phase of RW head 56 relative to SSMs 24 contained within the first magnetic reference pattern. In this method, the hard disk drive controller generates a FTF error signal and a TCE signal. These two signals provide a feedback signal used to control velocity and phase of RW head 56 relative to SSMs 24. Therefore enabling or facilitating the exact positioning of RW head 56 relative to the first magnetic pattern. Since this methodology uses the SSMs of the first reference pattern to position RW head 56 when defining the second magnetic reference pattern, cumulative positioning errors are avoided. These cumulative positioning errors occur when the RW head is positioned during the SSW process based on previously written servo tracks. Positioning the RW head based on the SSM during the SSW process reduces or eliminates the positioning error of the RW head during the SSW process, resulting in a more accurate positioning of the servo tracks on the drive which will ultimately result in a higher quality end product at a lower cost.

Most SSW processes utilize a clock or timing circuit to compare the football to football (FTF) time between spirals, wherein a position error may be generated based on the error between the expected time between spirals and the FTF. This requires an accurate clock circuit to provide a timing signal with which to determine the timing error. Embodiments of the present invention are able to eliminate the need for the clock circuit by measuring both the FTF and a track center error (TCE) wherein the TCE represents a phase error. The velocity signal and phase error signal when combined allow the disk controller to accurately determine the position of the RW head given knowledge of the spiral servo pattern on the disc.

Figure 7A:
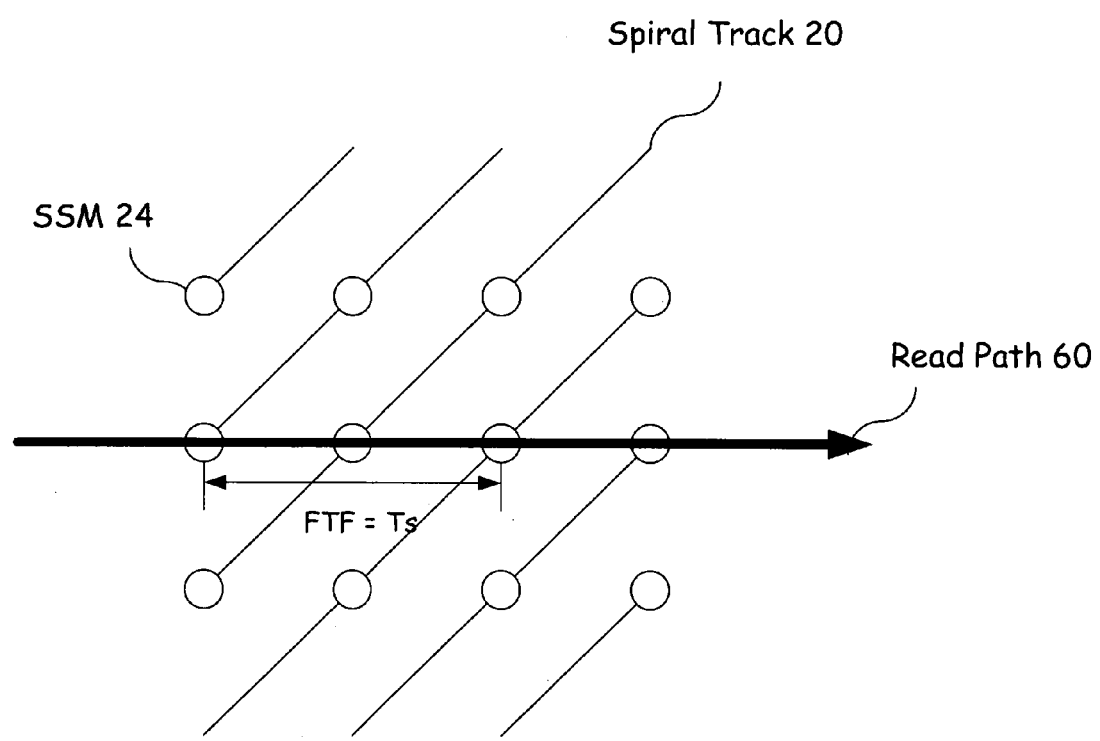
FIGS. 7A-7C illustrate the affect of radial alignment of the read path to FTF.
Figure 7B:
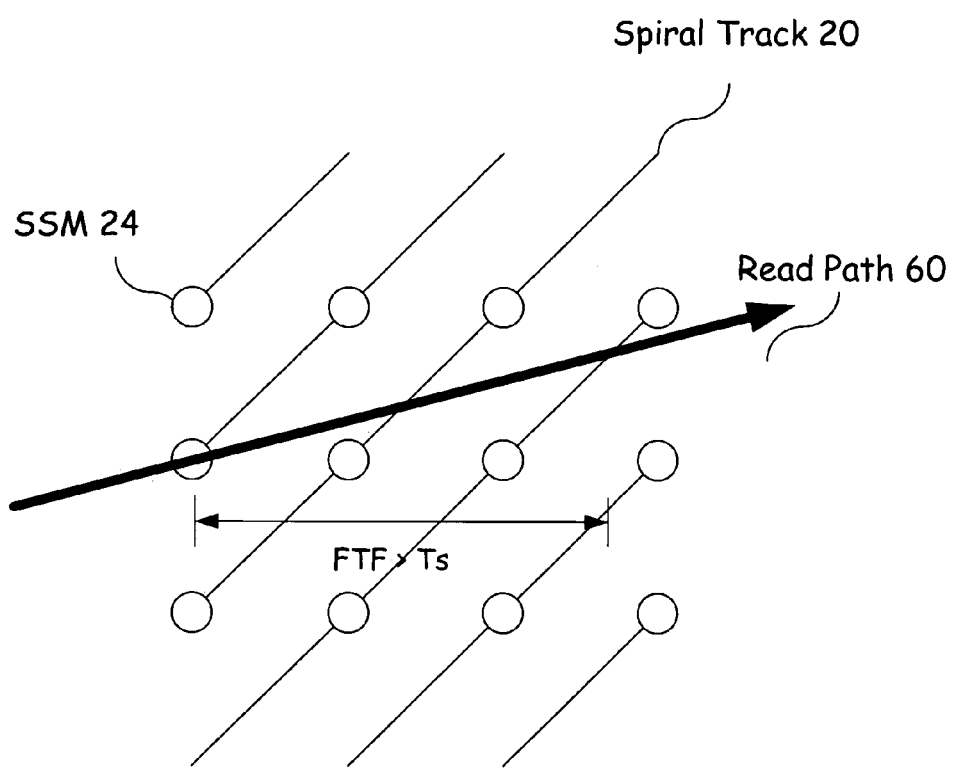
Figure 7C:
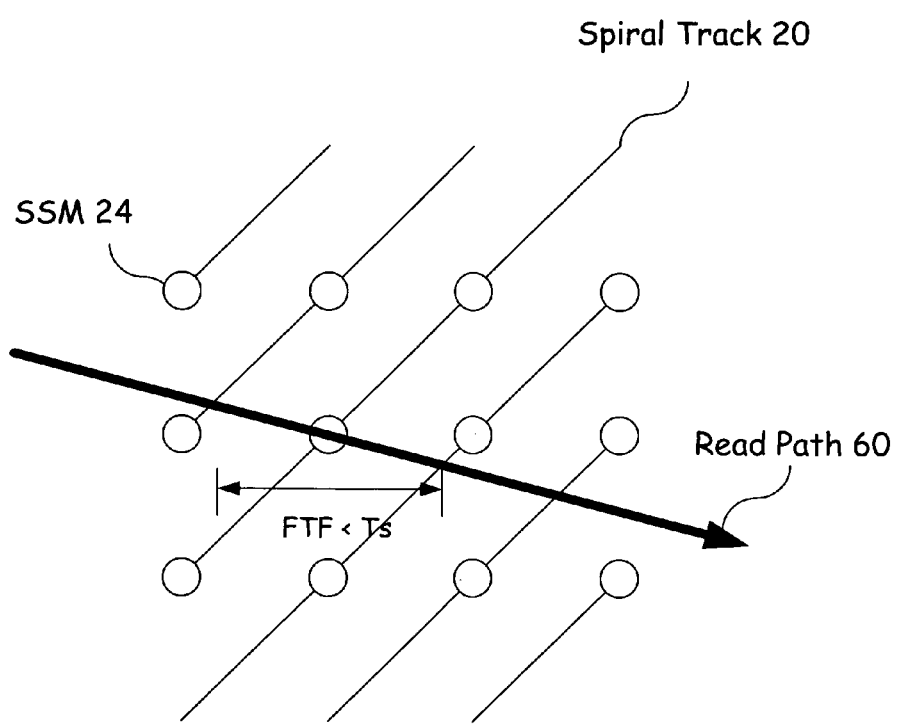

FIGS. 7A, 7B, and 7C depict how the football to football (FTF) time of the RW head between spirals 20 and SSMs 24 within the spirals can indicate the velocity and direction of the RW head. For example, in FIG. 6A, the FTF is equal to the expected time between spirals $T_s$. This equality indicates that the read path is radially aligned and the RW head is properly maintaining a constant radial distance during the read. A FTF between spirals less than the expected time between spirals, $T_s$, as illustrated in FIG. 6B, indicates that the read path may be slanted towards the inner diameter of the disk. Similarly, FIG. 6C illustrates that should the FTF be greater than the expected time between spirals, $T_s$, the read path may be inclined towards the outer diameter and thus a constant radial position is not being maintained by the read right head. For proper radial alignment, the FTF should equal $T_s$ throughout the disk.

Figure 8:
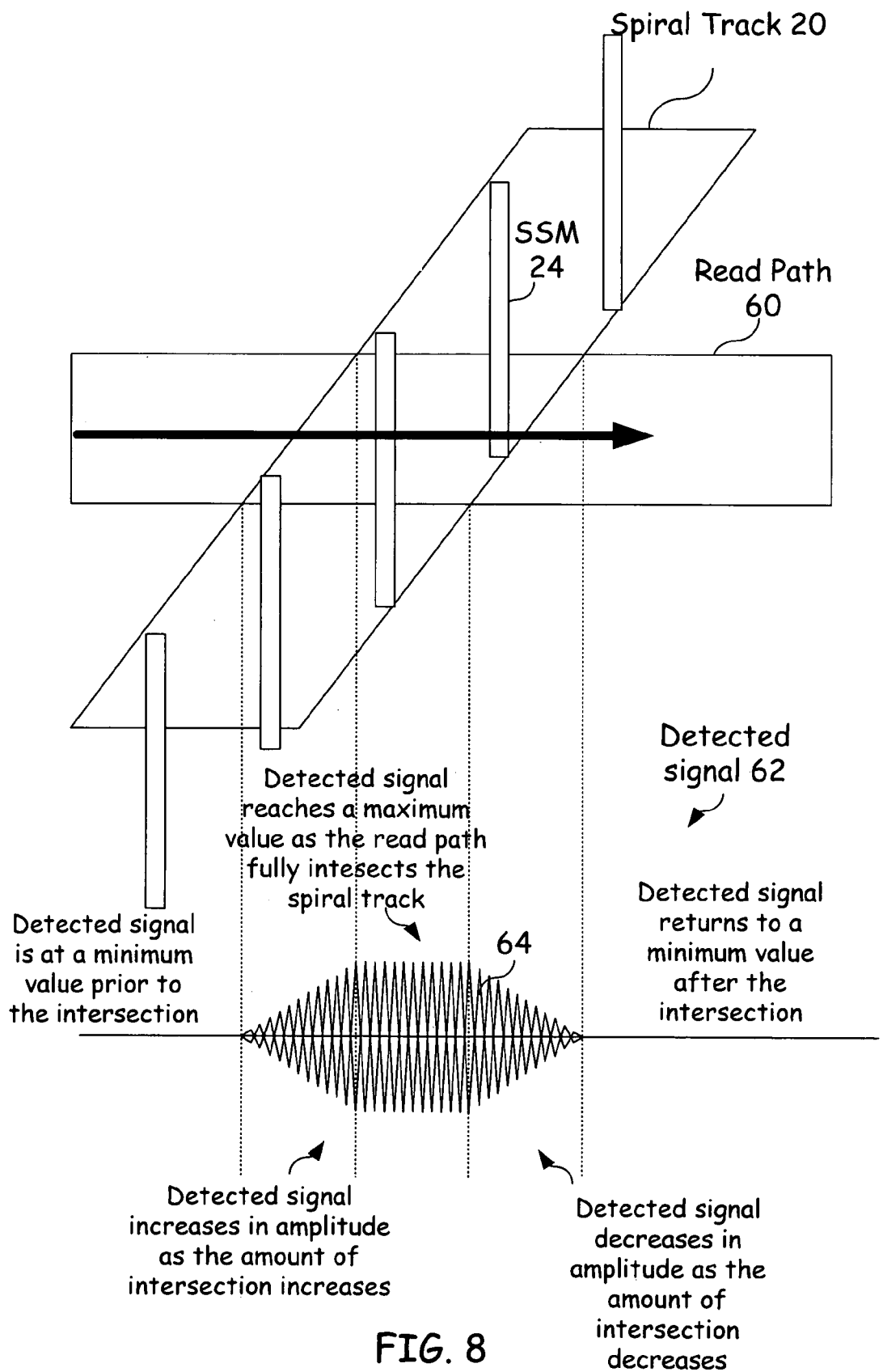
FIG. 8 illustrates how the amplitude of a detected signal changes as the read path intersects the spiral track.
Figure 9:
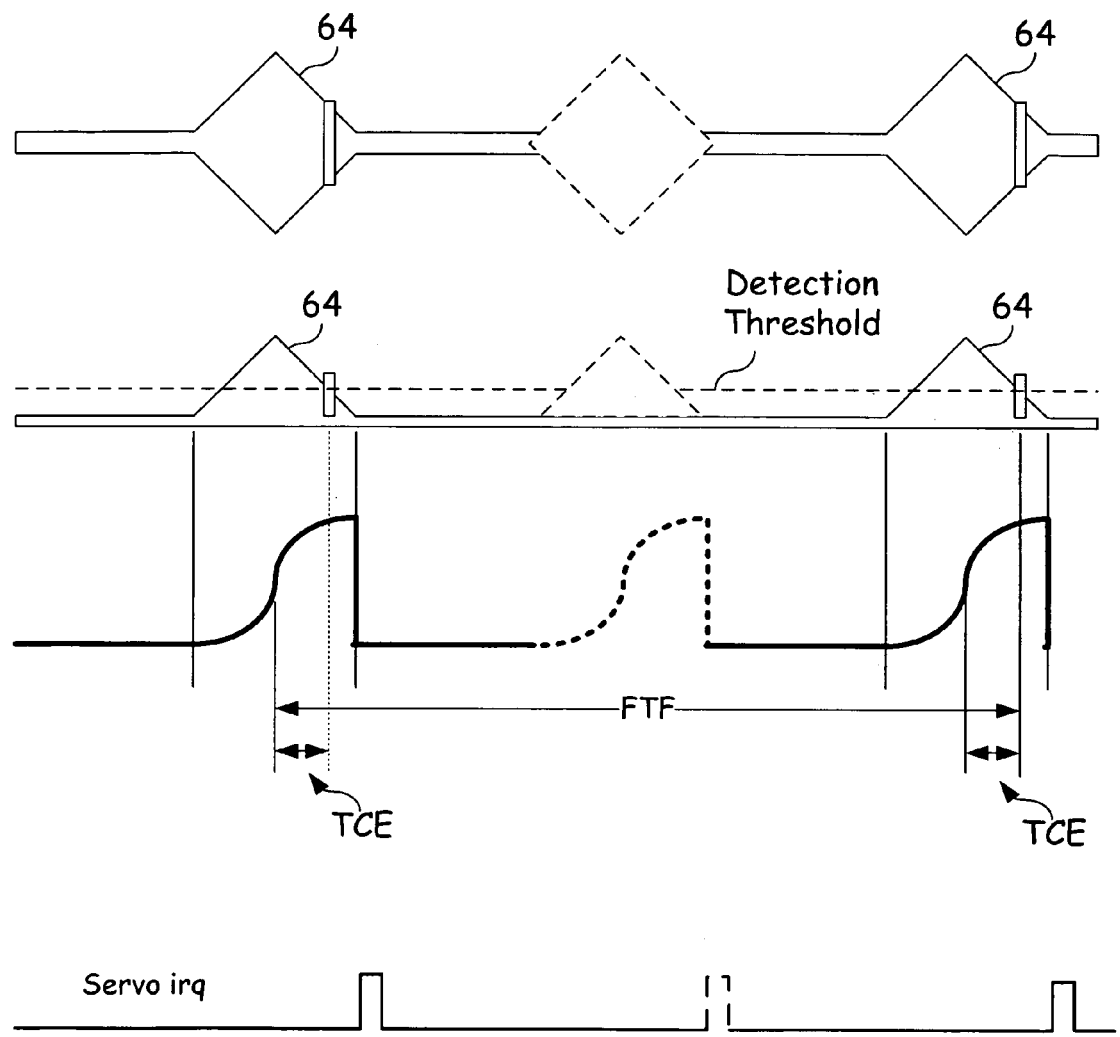
FIG. 9 provides a timing diagram illustrating how the FTF and TCE may be determined in accordance with an embodiment of the present invention.

FIG. 8 and FIG. 9 describe various timing components that may be measured as the read path 60 intersects a spiral track 20. As the RW head follows the read path 60, the read path 60 intersects a number of spirals tracks 20 written to the disk. The amplitude of the signal detected by the RW head is shown as detected signal 62. Prior to the intersection of the read path and the spiral track, the amplitude of the detected signal is a minimal or nominal value. As read path 60 intersects the spiral track 20, the amplitude of the detected signal 62 increase until the read path is located entirely over the spiral track. At this point, the amplitude of the detected signal will reach a maximum value. This maximum value may continue until the read path coverage of the spiral track decreases. During this time, the amplitude of the detected signal 62 returns to the minimal or nominal value. These amplitude changes within detected signal 62 are shown in the timing diagram beneath the intersection of the read path for the spiral track. The amplitude of detected signal 62 forms a diamond or football-like shape 64 which will be discussed in further detail with reference to FIG. 8.

To determine the phase error associated with the read path, it is important to determine the track center error (TCE) which is the difference in time and location and between the SSM located within the spiral track and the center of the diamond or football-like shape 64 formed as the read path intersects the spiral track. Ideally, the SSM should be detected at the center of the diamond or football-like shape 64. FIG. 8 provides a timing diagram that first shows the amplitude of the detected signal 62 wherein a number of diamond or football-like shapes 64 are formed as the read path 60 intersects a series of spiral tracks 20. Located within these spiral tracks are SSMs 24. These SSMs provide an additional signal that may be used to determine the phase error. This phase error is the difference between the center of the diamond or football-like shapes 64 and the location of the detected SSMs.

One embodiment of the present invention may utilize a simple, robust, flexible method with no format overhead to record and detect track number and index position to enhance efficiency of SSW. Typically, there are two spirals per wedge to wedge. So, the number of spirals is twice the number of wedges. The RW head usually detects and locks on the even or the odd set of spirals and switches between the two sets when appropriate. When the RW head on a track intercepts a spiral, the read back signal looks like a football shape profile as shown in FIG. 8. Typically, there are a number of SSM's and spiral bursts within one football profile. Two SSM patterns are designated to represent a "1" (SAM1) and a "0" (SAM0). Track number is recorded 1 bit per spiral. An N-bit track number is recorded on N spirals in the even set and the odd set. So no matter which set the head is using, the track number can be read. The SSM in the center of the football indicates "1" or "0" for the track number bit. Even if the head is off track by a certain amount, the adjacent SSM is read but it is still correct. When there are three available SSM's, two SSM patterns are again designated as "1" (SAM1) and "0" (SAM0) and are written at the track centers. The third SSM is called SAMx and are written at all the locations which are not track centers. The SSM in the center of the football indicates a "1" or a "0" for the track number bit. If the head is off track by a certain amount, the SAM1 or SAM0 pattern will move forward or backward in the football but it still indicates the track number bit correctly. The advantage of this scheme is that the track center is marked and in the read back football signal, the amount of off track can be calculated from the distance of SAM1 or SAM0 from the center of the football. This also makes the timing error calculation simpler as there is no ambiguity which SSM should be used to derive the timing error signal.

In order to know precisely where the first bit of track number is, a starting pattern preceding the track number is recorded. This starting pattern is designed to be an invalid track number and will never occur inside the track number. A pattern of 41 bits (40 "1" and 1 "0") is chosen as the starting pattern as the track number will never exceed 40 bits. If a forth SSM is available, it can be used as index mark to indicate angular position. If it is not available, a 42 bit starting pattern (41 "1" and 1 "0") is used as index pattern.

Adjacent track numbers can be gray coded so that when the head is seeking from one track to the next, there is at most one track number bit error. This single bit error can be easily corrected by either reading the extra track number on a single track or by using the track number of previous track. Every four track lines up in the radial direction. So for a group of four tracks, the gray coded track numbers of the first and second tracks and the gray coded track numbers of the second and third tracks line up in the same direction. The gray coded track numbers of the third and fourth tracks line up in the opposite direction. The net effect is that all the track numbers stay on the same band from ID to OD. This makes index pattern writing and reading easy.

On a track number bit level, the length of the SSM and the SSM hardware detection tolerance can be optimized to trade off false detection versus miss detection. For the whole track number, parity code or error correcting code like Hamming code can be applied to enhance robustness of track number detection. Multiple track numbers are written on each track so the system can make use of this redundant information to enhance robustness.

Figure 10:
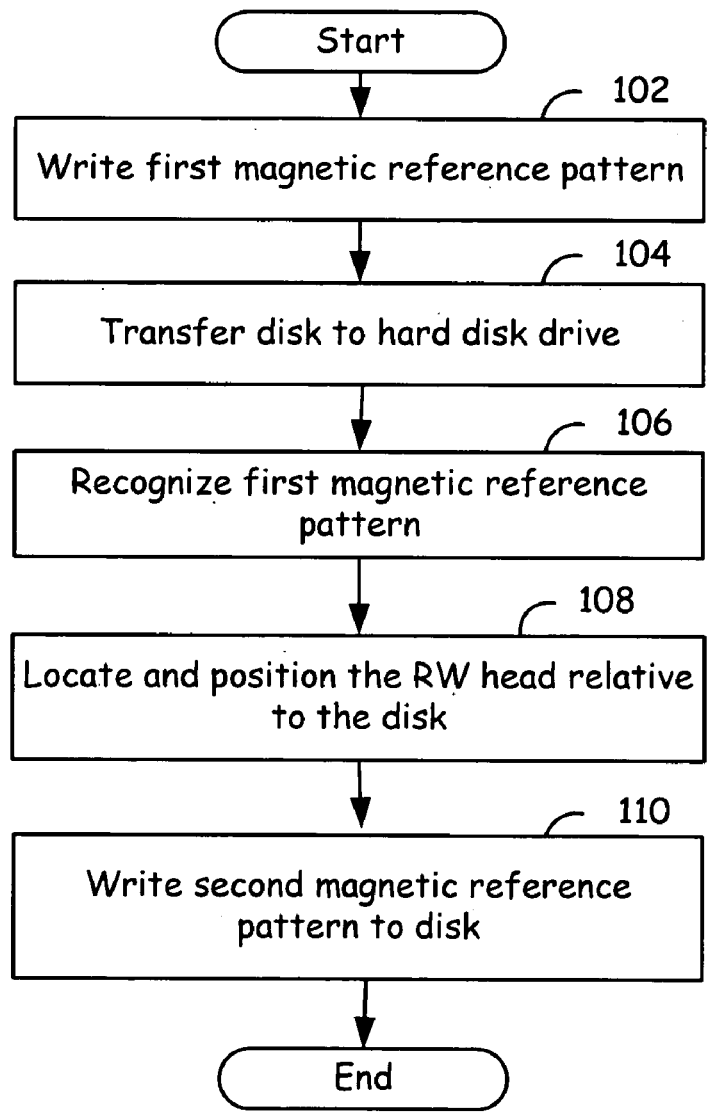
FIG. 10 provides a logic flow diagram illustrating a method operable to define magnetic reference patterns within magnetic media in accordance with an embodiment of the present invention.

FIG. 10 provides a logic flow diagram in accordance with one embodiment of the present invention. This process involves first writing a first magnetic reference pattern, such as a spiral reference pattern, using a servo writer in step 102. After this first magnetic pattern has been written to a disk in the servo writer, the disk may be transferred to a hard disk drive in step 104. The control circuitry or hard disk controller within the hard disk drive will recognize the first magnetic reference pattern in step 106. Control circuitry is operable to direct the positioning of the RW head within the hard disk drive based on the first magnetic reference pattern. This first magnetic reference pattern may, for example, be a spiral reference pattern that includes a number of SSM marks which will be used to accurately determine the position of the RW head relative to the disk in step 108. The RW head within the hard disk drive is used to write a second magnetic pattern to the disk in step 110. This second magnetic reference pattern may include a series of radially-spaced concentric tracks and sectors within the tracks.

The positioning of the RW head during the writing of the second magnetic reference pattern to the disk may be determined based on the velocity and phase between the RW head and the SSMs of the first magnetic reference pattern. The second magnetic reference pattern defines sectors and tracks within the disk wherein data may be stored and organized within the sectors and tracks of the disk. Additionally, the first magnetic reference pattern may be overwritten by the second magnetic reference pattern during this process.

Figure 11:
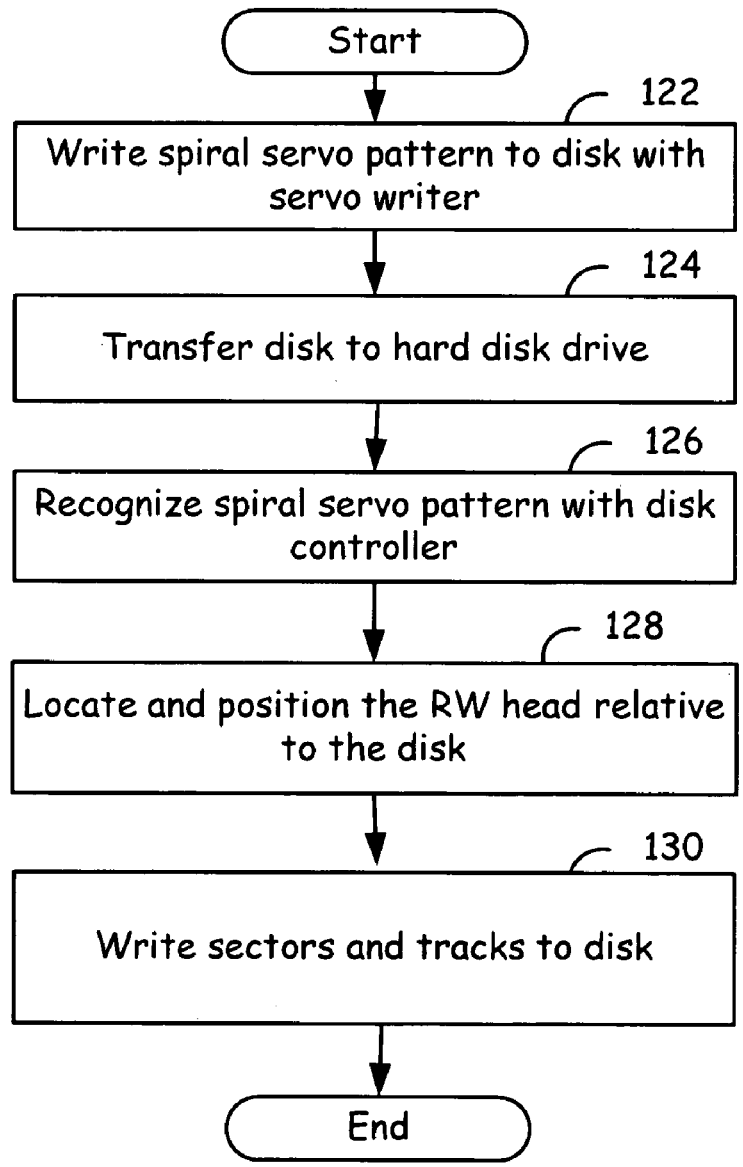
FIG. 11 provides a logic flow diagram illustrating a method operable to define sectors and tracks within magnetic media in accordance with an embodiment of the present invention.

FIG. 11 provides a second logic flow diagram of a process operable to define sectors and tracks within a magnetic disk. This involves writing a spiral reference pattern to the disk with a servo writer in step 122. This disk is then transferred from the servo writer to a hard disk drive in step 124. The disk controller of the hard disk drive is operable to recognize the spiral reference pattern in step 126. In step 128, the hard disk drive controller is then operable to locate and direct the positioning of the RW head within the hard disk drive based on the relative velocity and phase between the RW head and SSMs within the spiral reference pattern. By accurately positioning the RW head, a sectors and tracks may be written to the disk in step 130. During this writing process, the RW head location is determined based on the velocity and phase between the RW head and the first magnetic reference pattern. This avoids cumulative errors previously associated with SSW processes that determined the location of a subsequent sector and tract based on a previously defined sector and tract.

In summary, the present invention provides a method of generating magnetic reference patterns on a disk or other magnetic media. This involves writing a first magnetic reference pattern to the disk with a servo writer. The disk may then be transferred to a hard disk drive. Control circuitry within the hard disk drive may recognize the first magnetic reference pattern and then position a RW head within the hard disk drive based on the first magnetic reference pattern. As the RW drive is accurately positioned based on the first magnetic reference pattern a second magnetic reference pattern may be written to the disk using the RW head. The RW head location is determined based on the velocity and phase between the read-write head and servo setter marks contained within the first magnetic reference pattern.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

Although the present invention is described in detail, it should be understood that various changes, substitutions, and alterations can be made hereto without departing from the spirit and scope of the invention as described by the appended claims.

What is claimed is:

1. A method operable to generate magnetic reference patterns on a disk, comprising:
   recognizing a first magnetic reference pattern on the disk, wherein the hard disk drive is operable to position a read write (RW) head within the hard disk drive, based on the first magnetic reference pattern; and
   writing a second magnetic reference pattern to the disk using the RW head within the hard disk drive, wherein the RW head location is determined based on a velocity and phase between the RW head and a servo setter mark (SSM).

2. The method of claim 1, wherein the first magnetic reference pattern is a spiral pattern.

3. The method of claim 1, wherein the hard disk drive is operable to organize data to disk based on the second magnetic reference pattern.

4. The method of claim 1, wherein the second magnetic reference pattern define sectors and tracks within the disk.

5. The method of claim 1, wherein the first magnetic reference pattern is written from an inner diameter of the disk towards an outer diameter of the disk.

6. The method of claim 1, wherein the first magnetic reference pattern is written from an outer diameter of the disk towards an inner diameter of the disk.

7. The method of claim 1, wherein the first magnetic reference pattern overwritten by the second magnetic reference pattern.

8. A hard disk drive, comprising:
   a disk controller;
   at least one read write (RW) head;
   at least one disk having a first magnetic reference pattern, wherein the disk controller is operable to write a second magnetic reference pattern to the at least one disk with the at least one RW head; wherein a position of the at least one RW head within the hard disk drive is based on the first magnetic reference pattern, wherein the RW head location is determined based on a velocity and phase between the RW head and the first magnetic reference pattern.

9. The hard disk drive of claim 8, wherein the first magnetic reference pattern comprises a spiral pattern and servo setter marks (SSM).

10. The hard disk drive of claim 8, wherein the hard disk drive is operable to organize data to the at least one disk based on the second magnetic reference pattern.

11. The hard disk drive of claim 8, wherein the RW head location is determined based on a velocity and phase between the RW head and the SSM.

12. The hard disk drive of claim 8, wherein the first magnetic reference pattern is written by a servo writer.

13. The hard disk drive of claim 12, wherein the first magnetic reference pattern is written from an inner diameter of the disk towards an outer diameter of the disk.

14. The hard disk drive of claim 12, wherein the first magnetic reference pattern is written from an outer diameter of the disk towards an inner diameter of the disk.

15. The hard disk drive of claim 8, wherein the first magnetic reference pattern overwritten by the second magnetic reference pattern.

16. A method operable to define sectors and tracks on a disk, comprising:
    writing a first magnetic reference pattern to the disk with a servo writer,
    transferring the disk to a hard disk drive;
    recognizing the first magnetic reference pattern on the disk, wherein the hard disk drive is operable to position a read write (RW) head within the hard disk drive, based on the first magnetic reference pattern; and
    writing a second magnetic reference pattern to the disk using the RW head within the hard disk drive, wherein the RW head location is determined based on a velocity and phase between the RW head and the first magnetic reference pattern, and wherein the second magnetic reference pattern defines sectors and tracks on the disk.

17. The method of claim 16, wherein the first magnetic reference pattern is a spiral pattern.

18. The method of claim 16, wherein the hard disk drive is operable to organize data to disk based on the second magnetic reference pattern.

19. The method of claim 16, wherein the RW head location is determined based on a velocity and phase between the RW head and the SSM.

20. The method of claim 16, wherein the servo writer comprises a laser positioning system operable to precisely locate and position a servo writer RW head, wherein the servo writer RW head is operable to write the first magnetic reference pattern to disk.

21. The method of claim 16, wherein the first magnetic reference pattern is written from an inner diameter of the disk towards an outer diameter of the disk.

22. The method of claim 16, wherein the first magnetic reference pattern is written from an outer diameter of the disk towards an inner diameter of the disk.

23. A disk controller operable to generate a magnetic reference pattern that defines physical structures within a disk, comprising:
    an interface module operable to couple the disk controller to a hard disk drive;
    a memory module; and
    a processing module operably coupled to the memory module, wherein a combination of the processing module and memory module are operable to execute instructions that:
        recognize an initial magnetic reference pattern on the disk;
        locate a read write (RW) head relative to the initial magnetic reference pattern on the disk, wherein the RW head's location is determined based on a velocity and phase between the RW head and the initial magnetic reference pattern; and
        direct the RW head to write the magnetic reference pattern that defines physical structures to the disk.

24. The disk controller of claim 23, wherein the disk controller is implemented as an integrated circuit.

25. The disk controller of claim 23, wherein the interface module is further operable to interface the hard disk drive to a host computer system.

* * * * *

UNITED STATES PATENT AND TRADEMARK OFFICE
CERTIFICATE OF CORRECTION

| | | |
|---|---|---|
| PATENT NO. | : 7,312,943 B2 | Page 1 of 1 |
| APPLICATION NO. | : 11/269068 | |
| DATED | : December 25, 2007 | |
| INVENTOR(S) | : King Wai Thomas Lau et al. | |

It is certified that error appears in the above-identified patent and that said Letters Patent is hereby corrected as shown below:

Column 8, line 56, in Claim 8: replace "head;" with --head,--

Column 9, line 18, in Claim 16: replace "writer," with --writer;--

Signed and Sealed this

Twelfth Day of August, 2008

JON W. DUDAS
*Director of the United States Patent and Trademark Office*